Sept. 22, 1964   E. E. ANDERSON ETAL   3,149,978
PROCESS FOR COOKING CORN DOUGH IN THE FORM OF CHIPS
Filed April 27, 1960
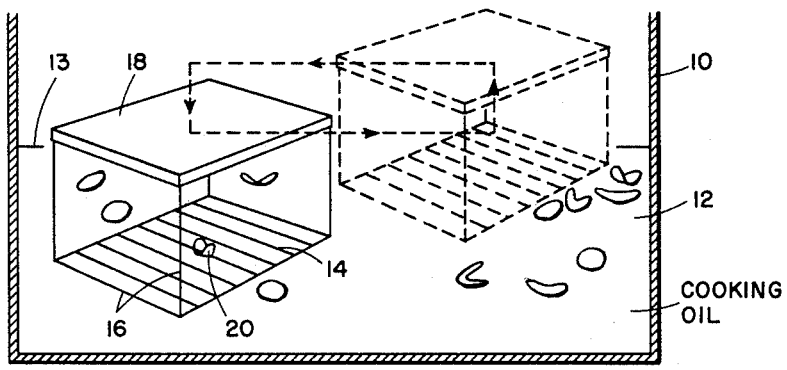
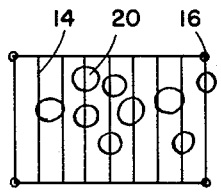
Fig. 4
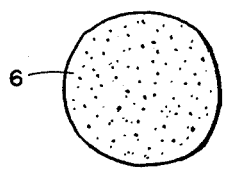
Fig. 1a
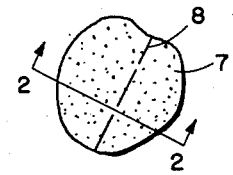
Fig. 1b
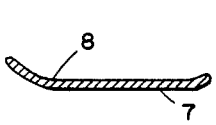
Fig. 2a
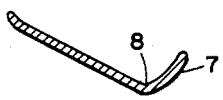
Fig. 2b
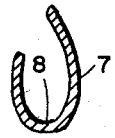
Fig. 2c
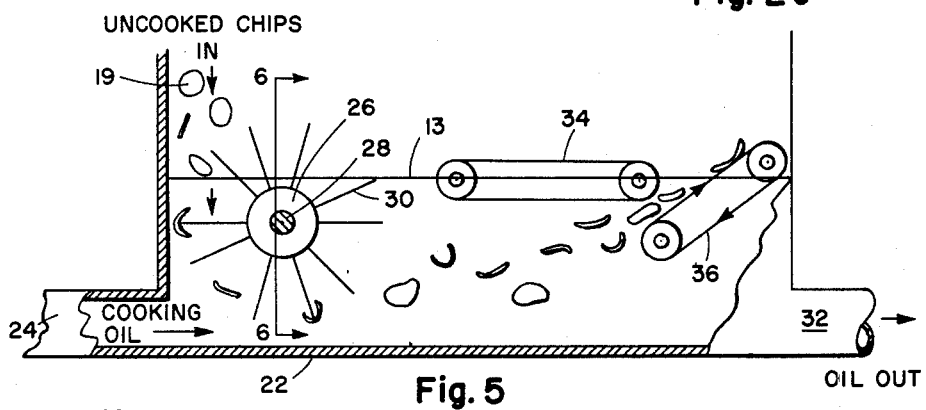
Fig. 5
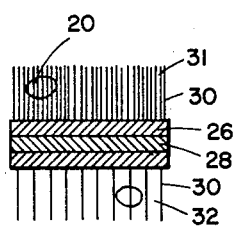
Fig. 6
Edward E. Anderson
Judith H. Tichenor   INVENTORS
Shirley A. Raymond
BY
Attorney 3,149,978
PROCESS FOR COOKING CORN DOUGH IN THE FORM OF CHIPS
Edward E. Anderson, Lexington, Judith H. Tichenor, Cambridge, and Shirley A. Raymond, Lawrence, Mass., assignors to Arthur D. Little, Inc., Cambridge, Mass., a corporation of Massachusetts
Filed Apr. 27, 1960, Ser. No. 25,125
3 Claims. (Cl. 99—80)

This invention relates to a food product and more particularly to a snack item formed by deep-fat frying corn masa dough.

In U.S.P. 2,905,559 there was disclosed a process for perforating corn masa dough in sheet form before deep-fat frying to produce a corn chip which was crisp, unblistered and flat. However, it has been found in packaging these flat chips that they tend to nest together. This in turn means that a package of a given size containing a given weight of chips is not well filled out for marketing. A more satisfactory configuration can be given to the chips to overcome this flatness by imparting to at least some of them a pleasing bent configuration. Moreover, it has also been found that when using these chips with certain snack dips it is more desirable to have them bent at least slightly while still retaining the improved characteristics of the essentially unblistered, crisp chips.

The problem of imparting a bent configuration to an otherwise flat, unblistered, crisp snack item is unique to chips made by cutting thinly rolled corn masa dough into desired configurations, e.g., circles, stars, rectangles or other polygonal shapes and cooking these by deep-fat frying. We have found that the desired configuration must be imparted at a specific time in the cooking process and in a manner to achieve a controlled bend in the chips, i.e., within certain angular limitations.

It is therefore an object of this invention to provide a method of imparting a controlled bent configuration to a corn masa dough chip which has been cooked by deep-fat frying. It is another object of this invention to provide apparatus for inducing the desired configuration to the corn chips during cooking. These and other objects will become apparent in the following description.

The process and apparatus of this invention will be presented more fully with reference to the accompanying drawings in which FIG. 1 illustrates a flat (FIG. 1a) and bent (FIG. 1b) corn chip;

FIGS. 2a–2c are cross-sectional representations of bent chips showing a range of degrees of bending;

FIG. 3 is a diagrammatic representation of an apparatus suitable for use in a batch cooking process to impart the desired configuration to corn chips;

FIG. 4 is a plan view of the bottom portion of the apparatus of FIG. 3;

FIG. 5 is a diagrammatic representation of an apparatus suitable for use in a continuous cooking process to impart the desired configuration to corn chips; and FIG. 6 is a side view of a portion of the apparatus of FIG. 5.

Imparting the necessary configuration to the corn chips cannot be accomplished before they are introduced into the deep fat in which they are cooked for the configuration would not be maintained permanently. Moreover, the desired configuration cannot be accomplished after the chips have been removed from the deep fat for they would break. It has, however, been found that the desired configuration can be imparted to the chips during cooking before a critical time when the chips assume their permanent configuration whatever it may be.

The method of this invention for imparting a bent configuration to a flat piece of corn dough cooked in deep fat may be characterized as including the step of applying a force along an elongate narrow line or edge against the surface of the chip dough before the chip has assumed a permanent configuration in cooking. The time at which the configuration is imparted to the chip may be further defined as between the time the chip enters the fat and before it is cooked for about 30 seconds.

Immediately after the pieces of corn chip dough are introduced into the deep fat they sink, but as the water in the corn dough is removed by rapid boiling the chips rise rapidly to the surface of the cooking fat unless purposely restricted by a submerged barrier. The necessary force along an elongate edge which is to be applied to the corn chips may be thus achieved by moving the edge downwardly against the chips or permitting the chips to float up against the edge along which the force is applied as they move upwardly in the cooking process.

Deep-fat frying of the corn masa chips is accomplished in an edible oil maintained at a temperature between about 250 and 400° F. Cooking times normally range from about one-half to three minutes, depending upon the temperature at which the cooking is accomplished and the thickness of the product. It is, in fact, a time-temperature relation and it will be appreciated that the longer times are required for cooking in oils maintained at the lower temperatures.

FIG. 1a illustrates a typical flat corn chip 6 in circular form; while FIG. 1b shows the same circular chip 7 after being bent by applying a force along line 8 at a time when the dough during deep-fat frying was sufficiently plastic to be forced upward on both sides of line 8 to impart a bent configuration to the final chip. The degree to which the chip is finally bent may vary over a wide range, illustrated in FIGS. 2a, 2b and 2c. FIGS. 2a and 2c represent the extremes in degree of bending, FIG. 2a showing very little; FIG. 2c illustrating how the chip may have two almost parallel sides. In practice, it is preferred that the majority (more than one-half) of the chips which are bent have a configuration with a degree of bending lying somewhere between the two extremes of FIGS. 2a and 2c. Such a preferred configuration is represented in FIG. 2b. It will be appreciated that the bending need not (and usually does not) take place in the central portion of the chip and that what may be termed the "angle of bending" may vary widely from the almost 180° of FIG. 2a to a few degrees as in FIG. 2c. In these FIGS. 2a–2c the line at which the force was applied is indicated at 8.

Several types of apparatus have been found suitable for exerting the necessary force along an elongate edge against the corn chips in cooking. These are illustrated in FIGS. 3–6.

In FIG. 3 apparatus suitable for this invention when the corn chips are cooked in batches is diagrammatically illustrated. There is provided in this type of cooking a vessel 10 which contains cooking fat 12 maintained at a predetermined temperature by any suitable heating means. Within the vessel is the cooking oil, or fat, 12 (the level of which is represented by line 13) into which the pieces of cut and perforated corn masa dough are introduced in a batch and from which the finished chips are removed after cooking has been accomplished. In this method of cooking the apparatus for imparting the desired configuration to the corn chips consists of a series of parallel wires 14 or other elongate, relatively narrow surfaces which are mounted on any suitable frame such as 16 and suspended from a support 18 so that the wires 14 may be controllably moved within the oil 12. The spacing of the wires 14 is adjusted so that it is somewhat less than the diameter or maximum dimension of the chip which is to be cooked. The wires 14 may be periodically immersed into the cooking oil 12 to strike a portion of the cooking chips and then withdrawn; or the apparatus of FIG. 1 may be caused to move through a cycle as indicated by the dotted lines and arrows. Periodic immersion or cycling of the wire arrangement may be accomplished by any suitable means not shown. In introducing the parallel wires 14 into the cooking oil, it will be seen that they strike a chip such as 20 either by forcing the chip deeper into the oil or by the action of the chip rising after momentary presence in the cooking oil or by a combination of these actions. By this process not all of the chips are contacted and bent. This is preferred for it has been found desirable to package corn chips which are a combination of those having a flat and bent configuration, the latter amounting to from 25 and 75% of the total number of chips.

FIG. 4, which is a plan view of the bottom portion of the wires 14 and frame 16, illustrates how the parallel wires strike the flat chips in the cooking fat and how the chips are thus randomly bent. That is, they are not necessarily bent in the center of the chip.

FIG. 5 illustrates another type of apparatus which may be used in the practice of this invention. In this case the cooking process is a continuous one as contrasted to the batch process illustrated in FIG. 3. In the apparatus in FIG. 5 the hot cooking oil 12 is introduced or recirculated at one end of a cooking vessel 22 such as through conduit 24 while being withdrawn through a suitable conduit 32. As in FIG. 3, the level of the cooking oil is indicated by line 13. The corn dough chips 19 are introduced and forced down by means of the positive action of a drum-like arrangement such as illustrated at 26 and shown in detail in FIG. 6. This drum arrangement is rotated by any suitable means (not shown) on a shaft 28 and is conveniently equipped with spikes or other narrow or line-like contacting surfaces 30 which may be spaced at varying intervals so that the spacing between them may be such as to bend some and force others unbent through into the oil.

It may be desirable to provide a barrier within the cooking oil to keep the chips submerged during cooking in order to achieve uniformity of cooking. One type of a suitable barrier is the moving conveyor belt 34 shown in FIG. 5. In a cooking process adapted to a continuous operation it may also be desirable to furnish means for removing the cooked chips. The inclined endless belt 36 of FIG. 5 illustrates such a removing means.

In order to control the number of chips which will possess the desired bent configuration, the drum 26 of FIGS. 5 and 6 may have a plurality of rows of spikes 30, the spikes in some rows being spaced relatively close together (such as spacing 31 of FIG. 6) so that a chip 20 is caught up and, by the positive action of the row of turning spikes, is forced into the cooking oil without being bent and hence results in an essentially flat cooked chip. A suitable gridwork could, of course, be used in place of the closely spaced spikes.

In other rows, the spikes will be arranged with spacings 32 only a little less than the dimension of the chips, thus providing the necessary conditions to bend those chips contacting the spikes thus spaced.

By the proper adjustment of the spacings of the spikes or other elongate surfaces, the percentage of the chips which are bent may be controlled. These spikes 30 may, of course, be curved rather than straight as shown in the drawing.

It will be appreciated that the spikes 30 may be replaced by any other arrangement which provides the necessary elongate surface in a position to exert pressure on the surface of a portion of the chips being cooked.

It will be understood that FIGS. 3 and 5 illustrate two types of apparatus which are suitable for applying the necessary force along a line-like edge to the surface of the cooking corn chips. Many variations in such apparatus are possible and are within the contemplated scope of this invention. Suitable apparatus may be characterized as comprising means for applying pressure along an edge against the surface of a corn chip while it is being cooked in oil maintained at a suitable cooking temperature. The pressure applying means may be momentarily stationary in which case the natural tendency of the chip to rise in the cooking process exerts the required pressure. Alternatively, the pressure applying means may be moved downwardly in the cooking oil to strike the chip surface. A combination of these methods of applying pressure may, of course, also be employed so long as there is established within the cooking oil a differential motion between the chips and the line-like edge.

The process of this invention may be further illustrated in the following examples.

Corn chip dough was prepared and perforated as described in U.S. Patent 2,905,559. The resulting dough which was about 1 mm. thick, was cut into circular shapes 1⅝ inches in diameter. The apparatus illustrated in FIG. 3 was used to cook the dough in corn oil which had been preheated to about 390–400° F.

In the apparatus used in this example to impart the bent configuration to the chips, the wires 14 on frame 16 were spaced about one inch apart. A number of the uncooked circular chips were dropped into the cooking oil and the wires on the frame were immediately thereafter partially immersed into the hot cooking oil. The chips began to move actively in the oil due to the evolution of steam and after about one second started to rise to the surface. At this point they came into contact with the wires and a majority of them were individually forced around the wires to varying degrees, and with continued cooking a permanent bent configuration was imparted to them. The chips were cooked for a total of about 60 seconds and then were removed from the cooking oil. About 60% had the desired bent configuration and the angles of bending ranged within the limits illustrated by FIGS. 2a and 2c, with the majority having configurations resembling FIG. 2b.

Additional batches of the corn chip dough in the same circular configuration were cooked in oil as above. The wire spacing was in one case one-half inch and in another control example no mechanical device was used. In the first case where the wires were closer together than in the example above, only 25% of the finally cooked chips had a bent configuration. In the control cooking without the use of any mechanical device to apply pressure, less than 6% of the corn chips had any bending at all.

It will be seen from the above description of this invention that there is provided a method and apparatus for controlling the configuration of corn masa dough shapes whch are to be cooked in hot cooking oil. The percent of chips to which the bent configuration is imparted may be controlled. The final chips have a pleasing variation in shape, are more versatile in their end use, and when they are packaged for marketing they fill out the package without any appreciable nesting of the chips.

We claim:

1. A process of cooking corn dough in the form of thin pieces, comprising the steps of introducing said pieces into hot cooking oil; applying, within 30 seconds of their introduction into said oil, to surfaces of said pieces a momentary force exerted along a straight line across each of said surfaces before said pieces have assumed a permanent configuration in said oil thereby to impart a bent configuration to said pieces to which said force is applied while maintaining said pieces freely suspended in said oil during said cooking whereby there is established a differential motion between chips and the applied momentary force; continuing said cooking until the pieces are cooked and the bent configuration is thereby rendered permanent; and then removing the bent cooked pieces from said cooking oil.

2. A process in accordance with claim 1 wherein said hot cooking oil is maintained at a temperature between about 250° F. and 400° F. during said cooking steps.

3. A process in accordance with claim 1 wherein between 25% and 75% of said surfaces are subjected to said force.

References Cited in the file of this patent

UNITED STATES PATENTS

| | | |
|---|---|---|
| 896,708 | Bruce | Aug. 25, 1907 |
| 1,576,321 | Gasser | Mar. 9, 1926 |
| 2,002,053 | Doolin | May 21, 1935 |
| 2,186,345 | Reidenbach | Jan. 9, 1940 |
| 2,585,036 | Roberts | Feb. 12, 1952 |
| 2,601,823 | McBeth | July 1, 1952 |
| 2,603,143 | Saenz | July 15, 1952 |
| 2,715,869 | Salvo | Aug. 23, 1955 |
| 2,905,559 | Anderson et al. | Sept. 22, 1959 |
| 2,907,268 | Doolin | Oct. 6, 1959 |
| 2,916,378 | Kunce et al. | Dec. 8, 1959 |
| 2,934,001 | Cunningham et al. | Apr. 26, 1960 |
| 3,020,162 | Cunningham et al. | Feb. 6, 1962 |